Feb. 17, 1959 T. W. WILLIAMS 2,873,610

TUNER AND CONTROL

Filed Dec. 15, 1954 3 Sheets-Sheet 1

INVENTOR.
THEO W. WILLIAMS
BY
Milton Ametz
ATTORNEY

Feb. 17, 1959 T. W. WILLIAMS 2,873,610
TUNER AND CONTROL
Filed Dec. 15, 1954 3 Sheets-Sheet 2

INVENTOR.
THEO W. WILLIAMS
BY Morton Amster
ATTORNEY

Feb. 17, 1959 T. W. WILLIAMS 2,873,610

TUNER AND CONTROL

Filed Dec. 15, 1954 3 Sheets-Sheet 3

INVENTOR.
THEO W. WILLIAMS
BY
Milton Amster
ATTORNEY

United States Patent Office 2,873,610

Patented Feb. 17, 1959

2,873,610

TUNER AND CONTROL

Theo W. Williams, Buffalo, N. Y., assignor to Sylvania Electric Products Inc., a corporation of Massachusetts Application December 15, 1954, Serial No. 475,456

17 Claims. (Cl. 74—10.45)

Figure 1:
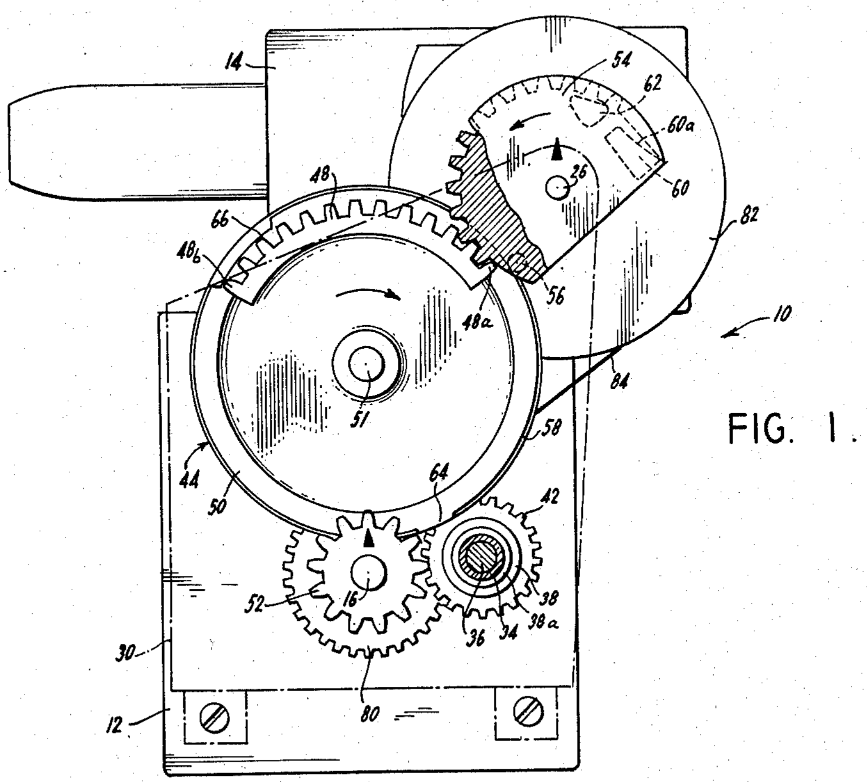

The present invention relates to a multi-band tuning unit for radio receivers, and in particular to mechanisms for tuning a television receiver over a relatively wide frequency spectrum. The present invention is specifically concerned with a tuner unit having a single-dial presentation and arranged to tune a television receiver to any one of the very high frequency or ultra high frequency band stations.

The assigned frequency spectrum for commercial television transmitting stations is the so-called V. H. F. band which comprises a group of twelve channels each 6 mc. wide and occupying the frequency bands of 54 mc. to 88 mc. and 174 mc. to 216 mc. These V. H. F. stations are referred to collectively as the low-frequency television stations even though the V. H. F. stations occur in two different frequency bands. Further assigned bands are in the so-called U. H. F. band and include some seventy channels each 6 mc. wide and occupying the frequency band of 470 mc. to 890 mc.

In television tuning units for such V. H. F. and U. H. F. receivers, it has been found impractical to provide a single tuning unit for selection in the entire spectrum of television frequencies. To this end, it has been suggested to provide a stepwise-variable tuning unit for station selection in the V. H. F. television band. Such V. H. F. tuner usually includes a switch for the selection of any one of the existing V. H. F. television stations, the tuner being arranged to convert signals received from any one of the V. H. F. television stations into corresponding intermediate frequency signals which are amplified and detected as is well understood in the art. Similarly the U. H. F. tuner, usually of the conventional multi ganged variable conventional type, is arranged to convert the signals received from any one of a plurality of U. H. F. television stations while the V. H. F. tuner is inoperative.

Broadly it is an object of the present invention to provide a new and improved television tuner which is arranged to provide complete coverage of the television frequency spectrum, including the V. H. F. and U. H. F. television bands. Specifically, it is within the contemplation of the present invention to provide an improved and simplified television tuning system including a stepwise-variable tuning unit for the V. H. F. television band and a continuously-variable tuning unit for the U. H. F. television band.

The coordination and control of the two separate tuning units has been of extreme concern to television set manufacturers, both from the standpoint of consumer acceptance and from the standpoint of production. Numerous tuning arrangements have been suggested, including the use of band selector switches. But it has been found that simplicity is a keynote for saleability, and that any complication in the tuning arrangement detracts from such saleability in that the average user has a basic reticence toward mechanisms which exhibit appreciable complexity. Thus, as a practical matter station selection should be accomplished by a single control which in sequence tunes the V. H. F. channels and the U. H. F.

channels. The realization of such criteria in a mass production multiple-unit tuning system is an imposing engineering problem which is somewhat complicated by the further requirement of fine or vernier tuning for the selected station in both the V. H. F. and U. H. F. bands from a single control.

It is a further object of the present invention to provide an improved television tuner including a stepwise-variable tuning unit for the V. H. F. television band and a continuously-variable tuning unit for the U. H. F. television band in which station selection may be achieved from a single control, and in which fine or vernier tuning of a selected station may likewise be achieved from a single control.

It is a still further object of the present invention to provide improved coordinating mechanisms for a dual-type television tuner by which in sequence station selection may be achieved from a single control. To advantage, such single control is easily manipulated and requires no skill for actuation yet is inexpensive to manufacture without any sacrifice in accuracy or facility for tuning.

In accordance with an illustrative embodiment demonstrating features of the present invention, an improved television tuner is provided which includes a stepwise-variable V. H. F. tuning unit and a continuously-variable U. H. F. tuning unit, which units are selectively actuated from a single control and in sequence by the provision of coordinating mechanisms which become operative at the low end of the U. H. F. band or the high end of the V. H. F. band to achieve automatic switchover from one tuning unit to the other. As a feature of the invention, a vernier-tuning system is provided which may be operated from a single control and is effective for fine tuning of both the V. H. F. and U. H. F. tuning units.

Figure 2:
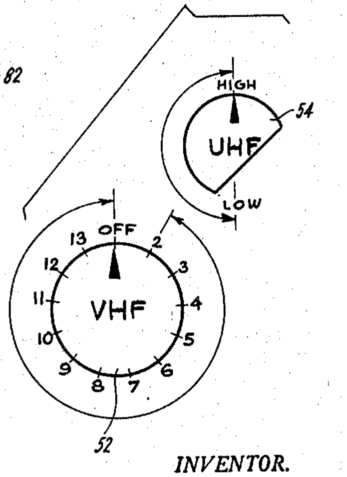
Figure 3:
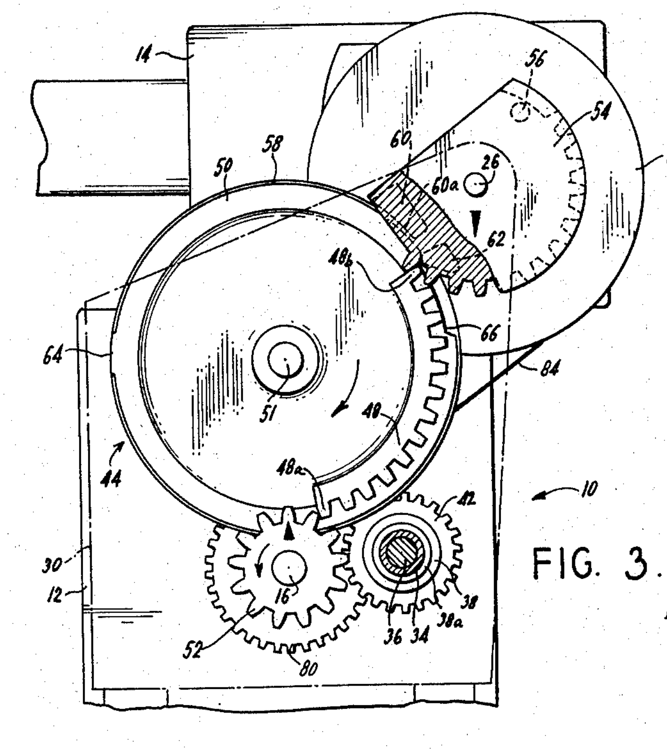
Figure 4:
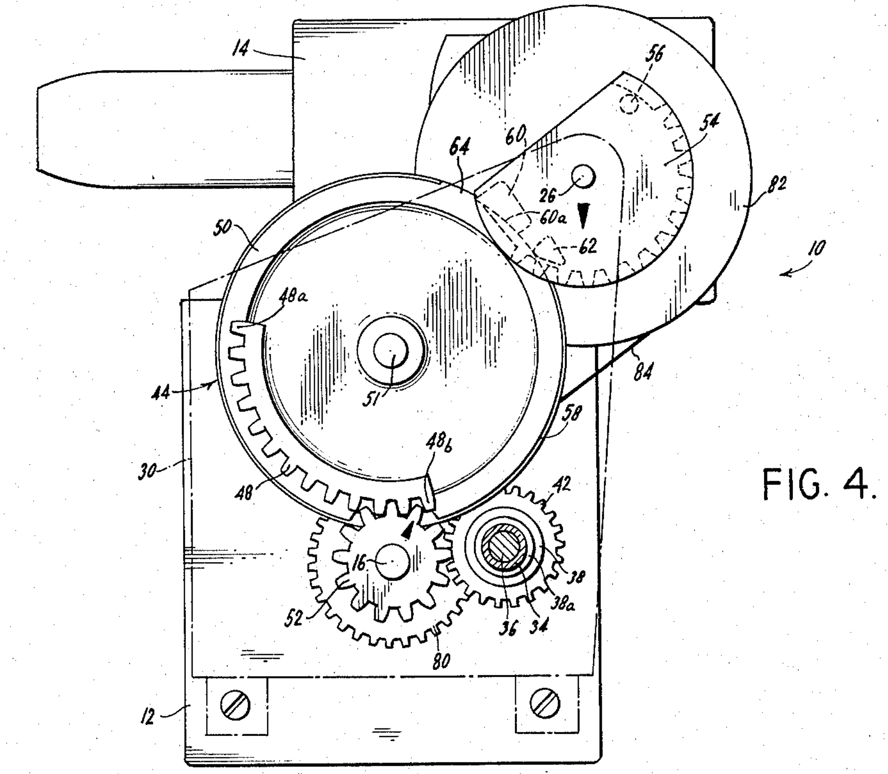
Figure 5:
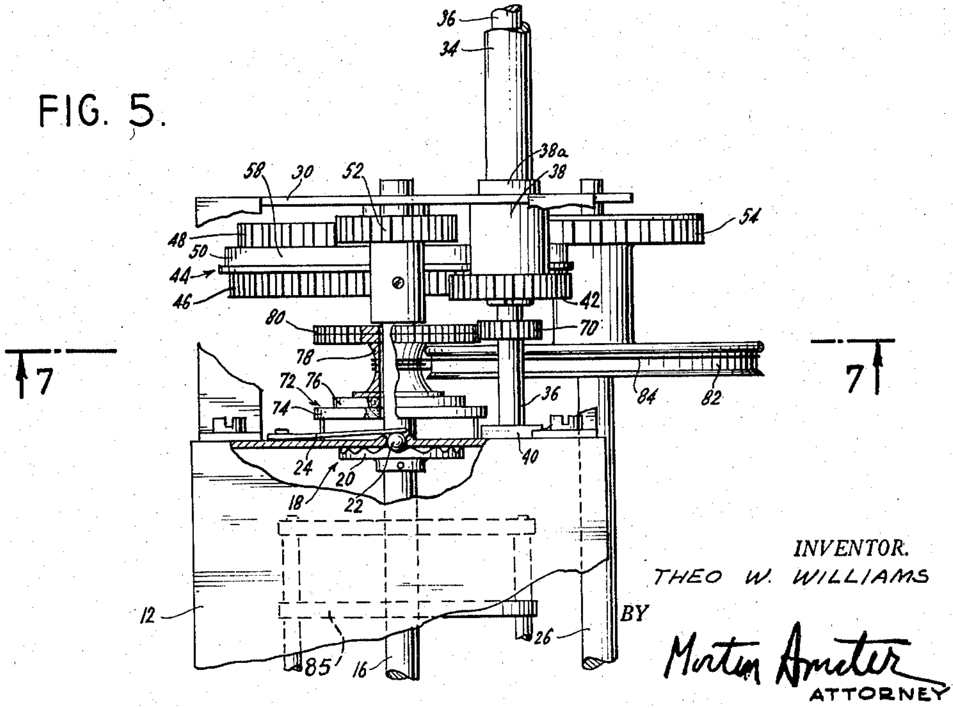
Figure 6:
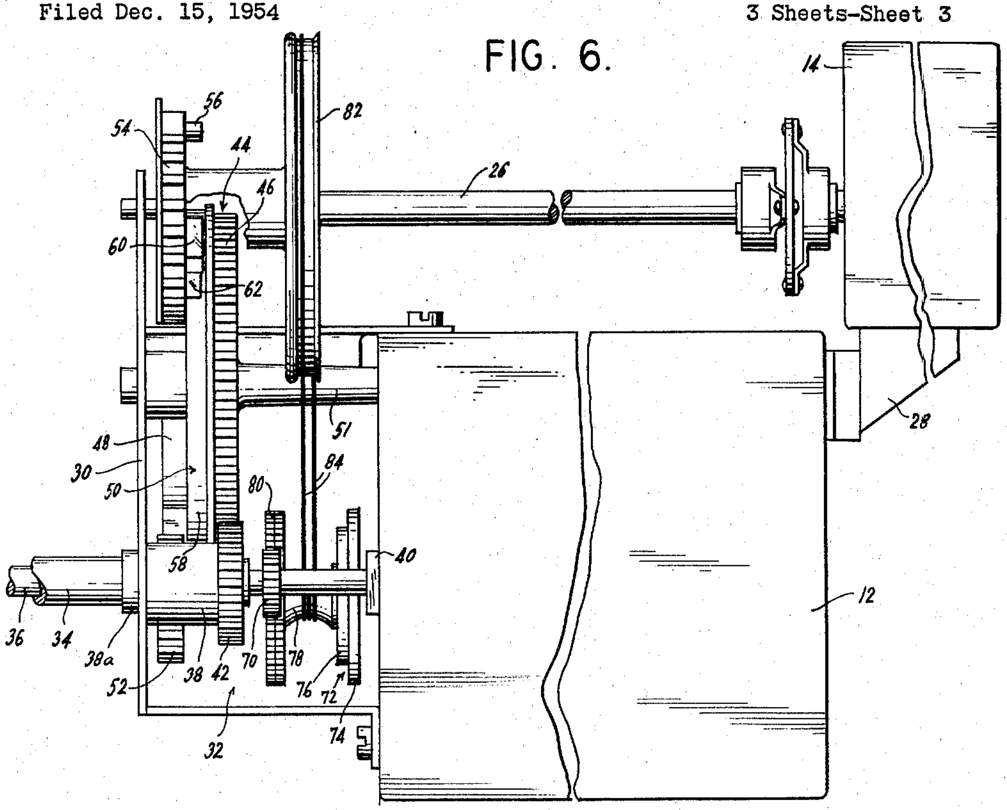
Figure 7:
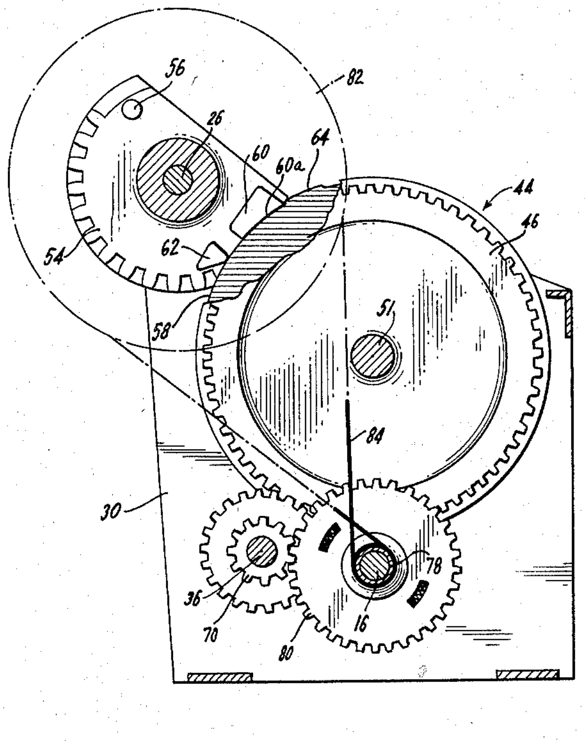

The above and still further objects, features and advantages of the present invention will be best appreciated upon reference to the following detailed description of a presently preferred but illustrative embodiment, when taken in conjunction with the accompanying drawings, wherein:

Fig. 1 is a front elevational view, with parts removed and sectioned, of a combined V. H. F.-U. H. F. tuner embodying features of the present invention, shown tuned to the high end of the U. H. F. band;

Fig. 2 is a diagrammatic representation illustrating the tuning sequence for the combined V. H. F.-U. H. F. tuner of Fig. 1, shown in a position corresponding to that illustrated in Fig. 1;

Fig. 3 is a front elevational view similar to Fig. 1, but showing the combined V. H. F.-U. H. F. tuner in the position corresponding to the low end of the U. H. F. band just prior to the switchover to the V. H. F. band;

Fig. 4 is a front elevational view similar to Fig. 1 showing the combined V. H. F.-U. H. F. tuner in its position of tuning corresponding to the low end of the V. H. F. band;

Fig. 5 is a bottom plan view of Fig. 4, with parts broken away and sectioned, showing details of the combined V. H. F.-U. H. F. tuner;

Fig. 6 is a side elevational view, as viewed from the right of Figs. 1, 3 and 4, and with parts broken away and sectioned; and, Fig. 7 is a sectional view taken substantially along the line 7—7 of Fig. 5 and looking in the direction of the arrows.

Referring now specifically to the drawings, there is shown a tuning unit for a television receiver which is adapted for the reception of both U. H. F. and V. H. F. signals. In that the details of the television receiver per se are well known, and may take the form of any of the conventional structures, description herein is unnecessary. In accordance with the present invention, the dual or combined tuner 10 includes a stepwise-variable V. H. F. tuning unit 12 and a continuously-variable U. H. F. tuning unit 14.

The V. H. F. tuning unit 12 includes a tuning shaft 16 which is connected to a multiple-section band switch 85, the construction and operation which is well known per se, for stepwise selection of the V. H. F. television stations in the frequency bands of 54 to 88 mc. and 174 to 216 mc. As seen best in Fig. 5, stepwise operation of the control shaft 16 is achieved by a detent mechanism 18 including a scalloped seating member 20 secured to the shaft 16, a ball 22 seated in the front wall of the tuning unit 12, and a leaf spring 24 biasing the ball 22 into engagement with the scalloped seating member 20. Accordingly, the tuning shaft 16 may be switched to any one of its positions as determined by the seating positions of the member 20 which in the illustrative embodiment include thirteen selection positions, twelve correspondng to channels 2 to 13 inclusive, and the thirteenth corresponding to an "off" position.

The U. H. F. tuner 14 is of the conventional continuously-variable type and includes a tuning shaft 26 which extends in substantial parallelism to the tuning shaft 16. The U. H. F. tuning unit 14 is mounted rearwardly of and above the V. H. F. tuning unit 12 by an appropriate supporting bracket 28, seen best in Fig. 6.

Spaced forwardly of the front wall of the V. H. F. tuner 12 is the upright wall 30 of a chassis which defines a housing 32 rearwardly thereof to accommodate therein drive and changeover mechanisms. Offset from and parallel to the tuning shafts 16, 26 is a control shaft assembly including an outer main control shaft 34 and an inner vernier control shaft 36 journaled within the outer main control shaft. The main control shaft 34 carries a tuning knob, not shown, appropriately disposed in relation to a dial on the control panel of the television set for station selection, while the vernier tuning shaft 36 carries a further knob, not shown, for making precise adjustments of the frequency at selected stations. The concentric shaft assembly 34, 36 is journaled on the upright wall 30 of the chassis, and on the front wall of the V. H. F. tuner by means of a sleeve 38 and an aligned bearing 40. The sleeve 38 has a reduced bearing part 38*a* extending through upright wall 30 and is fabricated of insulating material, such as nylon. The insulating sleeve 38 is secured to the main tuning shaft 34, while the insulating bearing 40 receives the terminal end of the vernier tuning shaft 36. Accordingly, the tuning shaft assembly 34, 36 is electrically insulated from the chassis which may be at a potential relative to ground, for example in receivers employing transformer-less power supplies.

Secured to or formed integrally with the sleeve or hub 38 is a main driving or master control gear 42 for control of both the V. H. F. and U. H. F. tuners 12, 14. The main driving gear 42 is coupled through an intermediate changeover assembly 44 to the tuning shaft 16 of the V. H. F. tuner and to the tuning shaft 26 of the U. H. F. tuner for selectively imparting drive to the respective tuners. The changeover assembly 44 includes a concentric intermediate gear 46, segmental gear track 48 and a cylindrical locking member 50. The assembly 46, 48, 50 is secured together for movement in unison and is journaled on a common intermediate supporting shaft 51 extending between the vertical wall 30 of the chassis and the front wall of the V. H. F. tuner 12. The intermediate gear 46 is in meshing engagement with the main drive gear 42 and may be selectively rotated in a clockwise or counterclockwise direction under drive of the main control shaft 36.

The segmental gear track or rack 48 is coupled during a selected portion of its rotary traverse to the tuning shaft 16 of the V. H. F. tuner by a meshing pinion 52. As seen in Figs. 1, 2 and 4, the meshing rack and pinion 48, 52 each have thirteen teeth, corresponding to the twelve station selection positions of the V. H. F. turner 12 and the "off" or inoperative position of the V. H. F. turner 12. The rack 48 is further arranged during a further portion of its rotary traverse to be in meshing engagement with a gear sector 54 which is coupled to the tuning shaft 26 of the U. H. F. tuner 14. The arrangement of the rack 48 relative to the selectively engageable driven members or gears 52, 54, is such that the rack 48, 50 is either in driving relation to one or the other of the members. Specifically, and as may be appreciated upon inspecting Figs. 1 to 4 in sequence, the U. H. F. tuner 14 is turnable from the high end of its band to the low end of its band in response to counterclockwise rotation of the gear sector 54 about its supporting shaft 26, as viewed in Fig. 1. As can be seen from the V-shaped position marker on the gear sector 54, which marker is further shown diagrammatically in Fig. 2, the gear sector 54 is in the position corresponding to the high end of the U. H. F. shaft in Fig. 1 and meshes with the leading tooth or end 48*a* of the rack 48. Accordingly, in response to clockwise rotation of the driving rack 48, the U. H. F. turner may be varied from its high to its low end. In the position illustrated in Fig. 3, which corresponds to changeover or transition from operation of the U. H. F. tuner 14 to operation of the V. H. F. tuner 12, it can be seen that the rack 48 has its trailing tooth or end 48*b* in meshing engagement with the driven gear sector 54. The trailing tooth 48*b* of the rack 48 is released from meshing engagement wtih the gear sector 54 as the leading tooth 48*a* meshes with the pinion 52 of the V. H. F. tuner. The pinion 52, in Fig. 3, is in the "off" position. In response to stepwise rotation in the counterclockwise direction, the driven pinion 52 selectively switches the V. H. F. tuner through the selection positions corresponding to the respective channels. As seen in Fig. 4, continued rotation of the intermediate gear 46 in the clockwise direction eventually switches the pinion 52 through its various positions of stepwise adjustment and tunes the V. H. F. tuner to its low end. Thus, continuous rotation of the rack 48 and intermediate gear 46 in the clockwise direction through a single revolution is effective to sweep the U. H. F. tuner 14 from its high end to its low end, and thereafter to sweep the V. H. F. tuner 12 from its high end to its low end.

An appropriate stop 56 (see Fig. 1) is carried on the inner face of the driven sector 54 which is engageable against the contact surface 58 of the cylindrical stop member 50 to limit the movement of the driven sector 54 of the U. H. F. tuner at the high end of the U. H. F. band.

The inner face of the driven gear sector 56 for the U. H. F. tuner 14 is formed integrally with or carries a pressure shoe 60 and a camming member 62. The pressure shoe 60 and the camming member 62 are effective during changeover of drive from the U. H. F. tuner to the V. H. F. tuner, and conversely during changeover from the V. H. F. tuner to the U. H. F. tuner to lock and release the driven gear sector 56. As may be appreciated by progressively inspecting Figs. 1, 3 and 4, the pressure or glide shoe 60 does not interfere with the provision of a driving connection to the driven gear sector 54 during the rotary traverse of the rack 48 from the position illustrated in Fig. 1 to that illustrated in Fig. 2, but is effective thereafter and during the rotary traverse of the rack 48 corresponding to tuning of the V. H. F. tuner to lock the driven gear sector 54 in relation to the concentric changeover and drive assembly 46, 48, 50. Specifically, just prior to changeover and in the position illustrated in Fig. 3, the contact or glide face 60*a* approaches a position of peripheral contact with the contact face or glide path 58 of the locking member or disk 50. During operation of the V. H. F. tuner, such as illustrated in Fig. 4, the locking member 50 and shoe 60 abut each other and lock the driven gear sector 54 against movement.

As can be seen in Fig. 7, a stop 64 is provided across the contact or glide path 58 which is engaged by the glide shoe 60 and limits rotary movement of the changeover assembly at the low end of the V. H. F. band.

Referring now to Fig. 3, the locking member 50 is seen to include a dwell or camming surface 66, appropriately formed and positioned in relation to the camming member 62 to be engaged by the latter at the changeover position to cam the contact or glide face 60*a* of the glide shoe 60 into peripheral contact with the glide path 58 of the locking member 50. Thus, the presence of the cooperating camming elements 62, 66 and their combined action at the changeover position assures the accurate disposition of the pressure shoe 60 in relation to the locking member 50.

The fine or vernier tuning for both the V. H. F. and U. H. F. tuners 12, 14 is effectuated from the single vernier control shaft 36 through a main drive gear 70 on the shaft 36 rearwardly of the main drive gear 42 for station selection. As seen best in Fig. 5, vernier tuning of the V. H. F. tuner is achieved by a "fine" tuning condenser 72 including a stator 74 and a rotor 76. The rotor 76 is secured to or formed integrally with a drum 78 and a driven gear 80, the assembly of the rotor 76, the drum 78 and the gear 80 being journaled upon the tuning shaft 16 of the V. H. F. tuner. The driven gear 80 meshes with the driving gear 70 and in response to rotary adjustment of the vernier fine tuning shaft 36, the rotor 76 may be adjusted in relation to the stator 74.

Fine tuning of the U. H. F. tuner is achieved through a pulley and cord coupling driven from the drum 78. Specifically, a large drum 82 is secured to the tuning shaft 26 of the U. H. F. tuner and is coupled to the small drum or spool 78 by means of the cord 84. Although the vernier tuning control for the U. H. F. and V. H. F. tuners are coupled to each other and appear to be concurrently effective, it is to be appreciated that the U. H. F. tuning shaft 26 is locked against rotary motion during tuning of the V. H. F. tuner and that the V. H. F. tuner is out of the circuit during operation of the U. H. F. tuner. Accordingly, during fine tuning of the V. H. F. tuner, the cord 84 slips in relation to its driving and driven drums 78, 82. During fine tuning of the U. H. F. tuner, the fine tuning condenser of the V. H. F. tuner is conjointly manipulated. However, this is of no effect, in that the V. H. F. tuner is out of the circuit.

A typical sequence of station selection in the V. H. F. and U. H. F. bands will now be detailed to facilitate a more thorough understanding of the present invention.

As is appreciated from a consideration of Fig. 2, the entire V. H. F. and U. H. F. bands may be displayed by a single dial presentation, in that both bands are selected by turning the main control shaft in a clockwise direction to rotate the intermediate gear 46 of the coupling and changeover assembly 44 through its clockwise traverse between the limit positions determined by the stop 56 and the further stop 64. For example, in the position illustrated in Fig. 4, the position marker on the pinion 52 of the V. H. F. tuner control corresponds to that of channel 2. Further, counterclockwise movement of the changeover and coupling mechanisms 44 from the position illustrated in Fig. 4 will drive the pinion 52 to the limit position in which the tooth of rack 48 to the left of the position marker is engaged at the trailing end 48*b* of the rack 48. Thereafter, further movement of the coupling mechanisms 44 in the clockwise direction is precluded due to the action of the glide shoe 60 and the stop 64 in the glide shoe path 58. Fine or vernier tuning in the selected position illustrated in Fig. 4 is achieved by manually manipulating the auxiliary or vernier tuning shaft 36, which through the driving chain of the gear 70 and the intermediate meshing driven gear 80 is effective to displace the rotor 76 of the condenser 72 in relation to its stator 74.

The selection of a station in the U. H. F. band from the starting position illustrated in Fig. 4 which corresponds to channel 2 in the V. H. F. band, merely requires turning the control shaft 34 in the counterclockwise direction. This turning is effective through the main drive gear 42 to impart counterclockwise motion to the intermediate gear 46 of the changeover assembly 44. Step by step, the V. H. F. tuner is moved through its various station-selection positions until ultimately the changeover position illustrated in Fig. 3 is reached, whereupon further counterclockwise motion of the changeover and coupling mechanisms 44 is effective to engage the trailing end 48*b* of the gear rack 48 with the driven sector 54 of the U. H. F. tuner. Continued rotary motion of the main control shaft 36 imparts drive to the driven gear sector 54 through the gear train of the main driving gear 42, the intermediate coupling gear 46, and the rack 48 movable with the intermediate coupling gear 46. After the desired station is reached in the U. H. F. band, vernier tuning is achieved by manipulation of the vernier tuning shaft 36. Such manipulation is effective via the gear 70, the meshing gear 80 and the drum and cord assembly 87, 82, 84 to fine tune the U. H. F. tuner.

Although only one form of the invention has been illustrated, a latitude of substitution is intended and in certain instances some features of the invention may be used without a corresponding use of other features. Accordingly, the appended claims should be afforded an interpretation consistent with the disclosure.

What I claim is:

1. In a television receiver, a U. H. F. tuner including station selector means, a V. H. F. tuner including station selector means, a main tuning shaft operatively connected to said station selector means of said V. H. F. tuner for tuning said V. H. F. tuner through multiple positions between the low end of said V. H. F. band and the high end of said V. H. F. band, and gearing means operatively connected between said main tuning shaft and said station selector means of said U. H. F. tuner, said gearing means being engaged in response to operation of said main tuning shaft and upon tuning of said V. H. F. tuner to the high end of said V. H. F. band and being arranged to provide a driving connection between said main tuning shaft and said station selector means of said U. H. F. tuner.

2. In a television receiver, a U. H. F. tuner including station selector means, a V. H. F. tuner including station selector means, said station selector means of said V. H. F. tuner being arranged to tune said V. H. F. tuner through multiple positions between the low end of said V. H. F. band and the high end of said V. H. F. band, a main tuning shaft, first engaging means operatively connected between said main tuning shaft and said station selector means of said U. H. F. tuner, said first engaging means being engaged in response to turning of said main tuning shaft and upon tuning of said V. H. F. tuner to the high end of said V. H. F. band and being arranged to provide a driving connection between said main tuning shaft and said station selector means of said U. H. F. tuner, and second engaging means operatively connected between said main tuning shaft and said station selector means of said V. H. F. tuner, said second engaging means being operative for tuning said V. H. F. tuner between the low and high ends of said V. H. F. band.

3. In a television receiver, a continuously variable U. H. F. tuner including rotatable station selector means, a stepwise-variable V. H. F. tuner including rotatable station selector means, a main tuning shaft, first engaging means operatively connected to said station selector means of said V. H. F. tuner and driven from said main tuning shaft for tuning said V. H. F. tuner through multiple positions between the low end of said V. H. F. band and the high end of said V. H. F. band, and second engaging means operatively connected to said station selector means of said U. H. F. tuner and driven from said main tuning shaft, said second engaging means being engaged in response to turning of said main tuning shaft and upon tuning of said V. H. F. tuner to the high end of said V. H. F. band and being arranged to provide a driving connection between said main tuning shaft and said station selector means of said U. H. F. tuner.

4. In a television receiver, a V. H. F. tuner including rotatable station selector means, a U. H. F. tuner including rotatable station selector means, a main tuning shaft, a master control gear operatively connected to and rotatable by said main tuning shaft, a gear track of limited arcuate extent operatively connected to said master control gear, a first pinion operatively connected to said station selector means of said V. H. F. tuner, and a second pinion operatively connected to said station selector means of said U. H. F. tuner, said first and second pinions being arranged relative to said gear track to sequentially provide driving connections to the respective station selector means of said tuners from said main tuning shaft.

5. In a television receiver, a V. H. F. tuner including rotatable station selector means, a U. H. F. tuner including rotatable station selector means, a main tuning shaft, a master control gear operatively connected to and rotatable by said main tuning shaft, a gear track of limited arcuate extent operatively connected to said master control gear, a first pinion operatively connected to said station selector means of said V. H. F. tuner, a second pinion operatively connected to said station selector means of said U. H. F. tuner, said first and second pinions being arranged relative to said gear track to sequentially provide driving connections to the respective station selector means of said tuners, and means for locking said second pinion against movement during the interval when a driving connection is provided through said first pinion to said station selector means of said V. H. F. tuner.

6. In a television receiver according to claim 5, the locking means for said second pinion including a contact plate secured concentrically of said master control gear and having a peripheral track, and a shoe carried by said second pinion and engageable against said peripheral track during said interval.

7. In a television receiver, a V. H. F. tuner including rotatable station selector means, a U. H. F. tuner including rotatable station selector means, a main tuning shaft, a master control gear operatively connected to and rotatable by said main tuning shaft, a gear track of limited arcuate extent operatively connected to said master control gear, a first pinion operatively connected to said station selector means of said V. H. F. tuner, a second pinion operatively connected to said station selector means of said U. H. F. tuner, said first and second pinions being arranged relative to said gear track to provide driving connection to the respective station selector means of said tuners, cooperating abutments on said second pinion and said master control gear for locking said second pinion against rotation during the interval when a driving connection is provided to said station selector means of said V. H. F. tuner, and means for camming said abutments in cooperating relation relative to each other in response to engagement of said first pinion with said gear track.

8. In a television receiver, a V. H. F. tuner including rotatable station selector means, a U. H. F. tuner including rotatable station selector means, a main tuning shaft, a master control gear operatively connected to and rotatable by said main tuning shaft, a gear track of limited arcuate extent operatively connected to said master control gear, a first pinion operatively connected to said station selector means of said V. H. F. tuner, a second pinion operatively connected to said station selector means of said U. H. F. tuner, said first and second pinions being arranged relative to each other and to said gear track to provide driving connections to the respective station selector means of said tuners, said first pinion meshing with said one end of said gear track when said V. H. F. tuner is at the high end of the V. H. F. band and meshing with the other end of said gear track when said V. H. F. tuner is at the low end of said V. H. F. band, said V. H. F. tuner being moved from the low end to the high end of said V. H. F. band in response to rotation of said master control gear in one direction, said second pinion being arranged to be released from meshing engagement with said gear track upon meshing of said first pinion with said one end of said gear track.

9. In a television receiver, a V. H. F. tuner including a station selector having multiple positions, each of said positions corresponding to a different V. H. F. television station, a U. H. F. tuner including a station selector for selecting different U. H. F. television stations, master control means having a gear track of predetermined arcuate extent, first pinion means meshable with said gear track for providing a driving connection between said master control means and said station selector for said V. H. F. tuner, second pinion means meshable with said gear track for providing a driving connection between said master control means and said station selector for said U. H. F. tuner, said first pinion means being engageable with said gear track at one extremity as said second pinion means is disengaged from said gear track at the opposite extremity, and means for locking said second pinion in relation to said master control means, the means for locking being operable in response to engagement of said first pinion with said one extremity of said gear track.

10. In a television receiver, a V. H. F. tuner including a station selector having multiple positions, each of said positions corresponding to a different V. H. F. television station, a U. H. F. tuner including a staiton selector for selecting different U. H. F. television stations, master control means having a gear track of predetermined arcuate extent, first pinion means meshable with said gear track for providing a driving connection between said master control means and said station selector for said V. H. F. tuner, and second pinion means meshable with said gear track for providing a driving connection between said master control means and said station selector for said U. H. F. tuner, said first pinion means being engageable with said gear track at one extremity as said second pinion means is disengaged from said gear track at the opposite extremity.

11. In a television receiver, a V. H. F. tuner including a station selector switch having multiple positions, each of said positions corresponding to a different V. H. F. television station, a U. H. F. tuner including a station selector having a rotor for selecting different U. H. F. television stations, master control means having a gear track of predetermined arcuate extent, first pinion means meshable with said gear track for providing a driving connection between said master control means and said station selector for said V. H. F. tuner, second pinion means meshable with said gear track for providing a driving connection between said master control means and said station selector for said U. H. F. tuner, said first pinion means being engageable with said gear track at one extremity as said second pinion means is disengaged from said gear track at the opposite extremity, means including cooperating abutments for locking said second pinion in relation to said master control means and operable in response to engagement of said first pinion with said gear track, and camming means for urging said abutments into cooperating relation in response to engagement of said first pinion with said gear track.

12. In a television receiver, a V. H. F. tuner including a station selector having multiple positions, each of said positions corresponding to a different V. H. F. television station, a U. H. F. tuner including a station selector for selecting different U. H. F. television stations, rotatable master control means having a driving sector of predetermined arcuate extent, first means engageable with said driving sector for providing a driving connection between said master control means and said station selector for said V. H. F. tuner, second means engageable with said driving sector for providing a driving connection between said master control means and said station selector for said U. H. F. tuner, said first means being engageable with said driving sector at one extremity as said second means is disengaged from said driving sector at the opposite extremity.

13. In a television receiver, a V. H. F. tuner including a station selector having multiple positions, each of said positions corresponding to a different V. H. F. television station, a U. H. F. tuner including a station selector for selecting different U. H. F. television stations, rotatable master control means having a driving sector of predetermined arcuate extent, first means engageable with said driving sector for providing a driving connection between said master control means and said station selector for said V. H. F. tuner, second means engageable with said driving sector for providing a driving connection between said master control means and said station selector for said U. H. F. tuner, said first means being engageable with said driving sector at one extremity as said second means is disengaged from said driving sector at the opposite extremity and means for locking said second means in relation to said master control means in response to engagement of said first means with said driving sector.

14. In a television receiver, concentric and independently rotatable main and vernier tuning shafts, a V. H. F. tuner including rotatable station selector means, a U. H. F. tuner including rotatable station selector means, a master control gear driven from said main tuning shaft, a gear track of limited arcuate extent operatively connected to said master control gear and rotatable therewith, a first pinion operatively connected to said station selector means of said V. H. F. tuner, a second pinion operatively connected to said station selector means of said U. H. F. tuner, said first pinion meshing with said gear track at one extremity and driving said station selector means of said V. H. F. tuner through said V. H. F. band in response to rotation of said master control gear, said second pinion meshing with said gear track at said one extremity and driving said station selector means of said U. H. F. tuner through said U. H. F. band in response to rotation of said master control gear, said second pinion being released from the opposite extremity of said gear track as said first pinion meshes with said one extremity of said gear track, vernier tuning means operatively connected to said vernier tuning shaft for adjusting tuning of said V. H. F. tuner, and further vernier tuning means operatively connected to said vernier tuning shaft for adjusting tuning of said U. H. F. tuner.

15. In a television receiver, a rotatable main tuning shaft, a V. H. F. tuner including rotatable station selector means, a U. H. F. tuner including rotatable station selector means, a master control gear driven from said main tuning shaft, a gear track of limited arcuate extent operatively connected to said master control gear and rotatable therewith, a first pinion operatively connected to said station selector means of said V. H. F. tuner, and a second pinion operatively connected to said station selector means of said U. H. F. tuner, said first pinion meshing with said gear track at one extremity and driving said station selector means of said V. H. F. tuner through said V. H. F. band in response to rotation of said master control gear, said second pinion meshing with said gear track at said one extremity and driving said station selector means of said U. H. F. tuner through said U. H. F. band in response to rotation of said master control gear, said second pinion being released from the opposite extremity of said gear track as said first pinion meshes with said one extremity of said gear track.

16. In a television receiver, concentric and independently rotatable main and vernier tuning shafts, a V. H. F. tuner including a rotatable station selector switch, a U. H. F. tuner including a rotatable station selector shaft, a master control gear driven from said main tuning shaft, a gear track of limited arcuate extent operatively connected to said master control gear, a first pinion operatively connected to said station selector switch of said V. H. F. tuner, a second pinion operatively connected to said station selector shaft of said U. H. F. tuner, said first pinion meshing with said gear track at one of its extremity and moving said station selector switch stepwise through said V. H. F. band in response to rotation of said master control gear, said second pinion meshing with said gear track at said one extremity and moving said station selector shaft continuously through said U. H. F. band in response to rotation of said master control gear, said second pinion being released from the opposite extremity of said gear track as said first pinion meshes with said one extremity of said gear track, vernier tuning means operatively connected to said vernier tuning shaft for fine tuning of said V. H. F. tuner, and means operatively connecting said station selector shaft to said vernier tuning shaft for fine tuning of said U. H. F. tuner.

17. In a television receiver, concentric and independently rotatable main and vernier tuning shafts, a V. H. F. tuner including a rotatable station selector switch, a U. H. F. tuner including a rotatable station selector shaft, a master control gear driven from said main tuning shaft, a driving sector of limited arcuate extent operatively connected to said master control gear, first engaging means operatively connected to said station selector switch of said V. H. F. tuner, second engaging means operatively connected to said station selector shaft of said U. H. F. tuner, said first engaging means engaging said driving sector at one of its extremity and moving said station selector switch stepwise through said V. H. F. band in response to rotation of said master control gear, said second engaging means engaging said driving sector at said one extremity and moving said station selector shaft continuously through said U. H. F. band in response to rotation of said master control gear, said second engaging means being released from engagement with the opposite extremity of said driving sector as said first engaging means engages said one extremity of said driving sector, vernier tuning means operatively connected to said vernier tuning shaft for fine tuning of said V. H. F. tuner, means operatively connecting said station selector shaft to said vernier tuning shaft for fine tuning of said U. H. F. tuner, and means for locking said second engaging means against movement upon engagement of said first engaging means with said driving sector.

References Cited in the file of this patent

UNITED STATES PATENTS

| | | |
|---|---|---|
| Re. 22,574 | Collins | Dec. 5, 1944 |
| 765,774 | Goldberg | July 26, 1904 |
| 1,643,782 | Loewe | Sept. 22, 1927 |
| 2,411,619 | Elliott | Nov. 26, 1946 |
| 2,579,659 | Fisher | Dec. 25, 1951 |
| 2,584,155 | Owens | Feb. 5, 1952 |
| 2,604,791 | Daly | July 29, 1952 |
| 2,613,540 | Keim | Oct. 14, 1952 |
| 2,756,599 | Sperber | July 31, 1956 |
| 2,773,390 | Oeler | Dec. 11, 1956 |